United States Patent [19]

Betsuno

[11] 4,181,097
[45] Jan. 1, 1980

[54] AUTOMATIC FEEDING DEVICES FOR DOMESTIC ANIMALS

[75] Inventor: Ikuo Betsuno, Okazaki, Japan

[73] Assignee: Chubu Shiryo Kabushiki Kaisha, Aichi, Japan

[21] Appl. No.: 856,775

[22] Filed: Dec. 2, 1977

[51] Int. Cl.² ............................................. A01K 5/02
[52] U.S. Cl. ................................. 119/51.11; 119/51.5
[58] Field of Search ........................... 119/51.11, 51.5

[56] References Cited

U.S. PATENT DOCUMENTS

| | | | |
|---|---|---|---|
| 3,625,183 | 12/1971 | Tartar | 119/51.11 |
| 3,722,475 | 3/1973 | Wittern et al. | 119/51.11 |

Primary Examiner—Hugh R. Chamblee
Attorney, Agent, or Firm—Dennison, Dennison, Meserole & Pollack

[57] ABSTRACT

An automatic device for feeding domestic animals with liquefied food. The device comprises a canister containing powder for preparing liquefied food, a feeder connected thereto, a tank containing liquid for preparing the liquefied food, a valve for opening and closing the tank, a mixer connected to the feeder and the valve to mix the powder and the liquid therein, a pipe for supplying the mixture of the powder and the liquid to feeding plates, a 24-hour program timer for setting feeding time and an electrical control circuit for working the feeder, valve and the mixer upon receipt of a signal from the program timer.

1 Claim, 5 Drawing Figures

AUTOMATIC FEEDING DEVICES FOR DOMESTIC ANIMALS

The present invention relates to an automatic device for feeding domestic animals with liquefied food.

To efficiently keep domestic animals such as pigs, it is necessary to make the best use of the facilities and facilitate reduction of labor. Besides, it is very important to keep baby pigs from diseases.

In general, newborn pigs are separated from their dams and raised by artificial feeding to prevent them from catching contagious diseases from their dams. However, such artificial feeding requires much time and labor since it is necessary to always keep feeding plates clean and feed the baby pigs with fresh milk to prevent scours and contraction of diseases.

The object of the present invention is to overcome the aforementioned disadvantages of the prior art by providing an automatic device for feeding domestic animals with fresh liquefied food such as artificial milk which is simple in construction and reasonable in cost.

According to the present invention, there is provided an automatic device for feeding domestic animals such as pigs with fresh liquefied food such as artificial milk in which powder such as powdered milk and liquid such as warm water are separately prepared and mixed at a certain ratio to be supplied to feeding plates.

The invention will now be described in further detail by way of example with reference to the accompanying drawings, in which.

Figure 1:
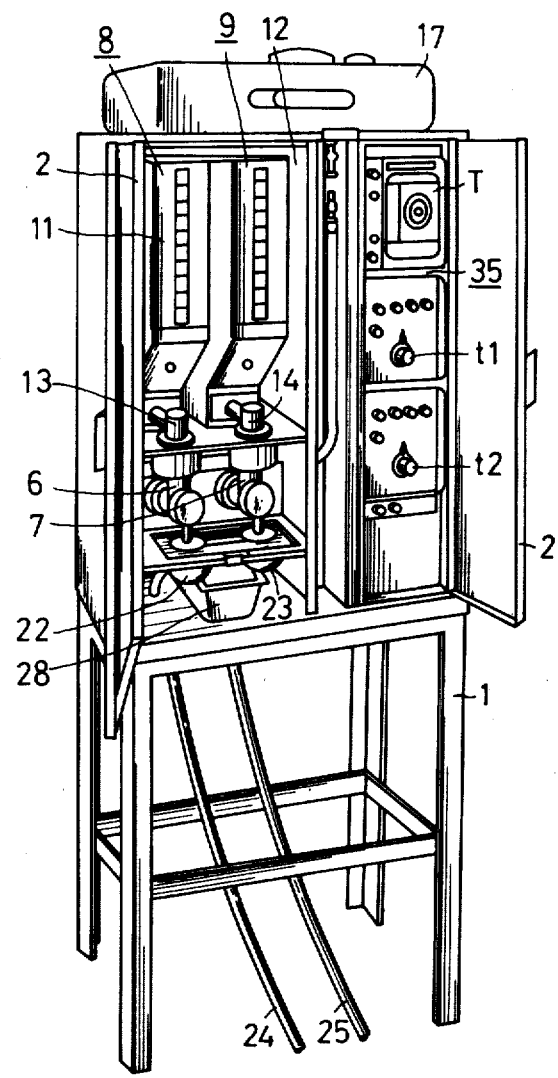
FIG. 1 is a perspective view of a device of the present invention.
Figure 2:
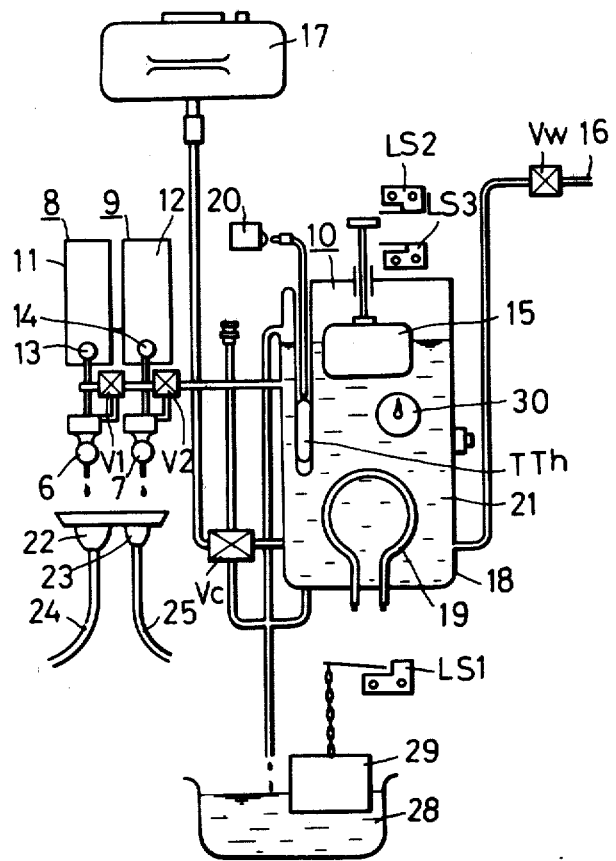
FIG. 2 is an illustrative view of the device of FIG. 1 partly in section.
Figure 3:
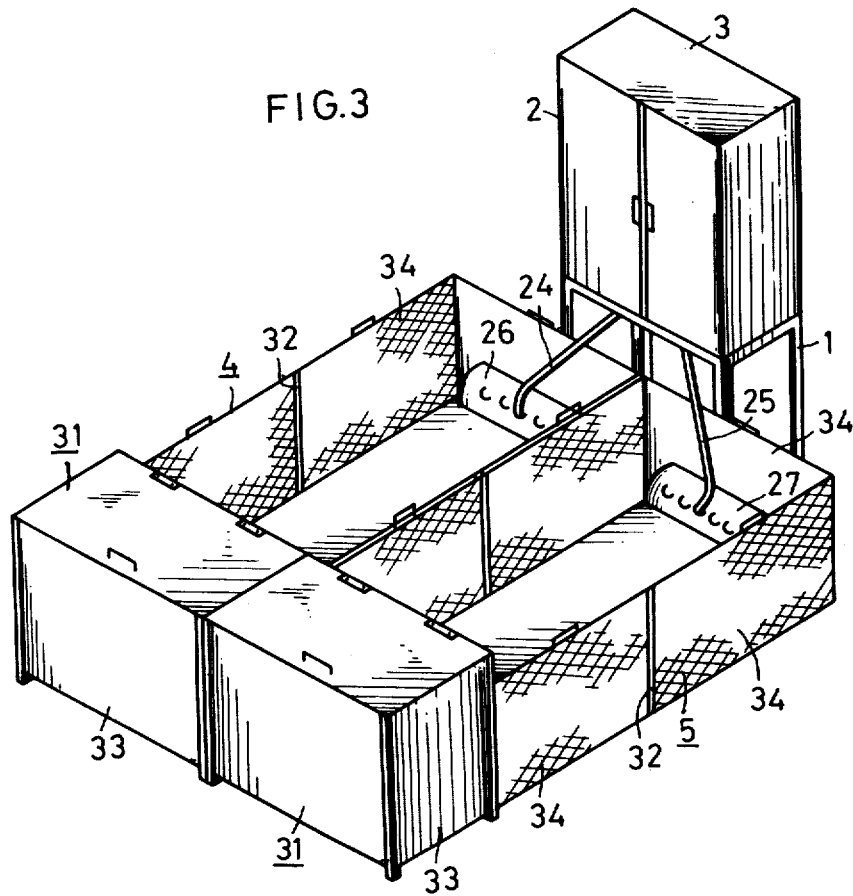
FIG. 3 is a perspective view of pigpens in which the device of the present invention is applied.

Referring now to FIGS. 1–3 of the drawings, there is shown a table 1 supporting a box 3 with a double door 2 mounted with milk feeders 8 and 9 for supplying powdered milk to mixers 6 and 7 and a water feeder 10 for supplying warm water to the mixers 6 and 7 to dissolve powdered milk therein so as to feed baby pigs in pigpens 4 and 5.

The powdered milk is prepared in consideration of the age of the baby pigs to be bred in the pigpens 4 and 5 and introduced into canisters 11 and 12 of the milk feeders 8 and 9 to be transmitted to the mixers 6 and 7 by spirals (not shown) rotated by motors M1 and M2 of feeders 13 and 14 mounted to the lower ends of the canisters 11 and 12. The volume of the powdered milk can optionally be determined by adjustment of operation time of the motors M1 and M2.

The warm water 21 is kept at a certain volume in a water tank 18 by virtue of a feed valve Vw of a water pipe 16 and another feed valve Vc of a cassette tank 17 controlled by a float 15 and limit switches LS2 and LS3 for detecting the maximum and minimum volumes of the warm water 21. The warm water 21 is also kept at a certain temperature in the water tank 18 by an automatic temperature controller 20 through a heater 19 and a temperature sensor TTh, and transmitted to the mixers 6 and 7 by adjustment of water valves V1 and V2. The volume of the warm water 21 to be transmitted to the mixers 6 and 7 is optionally determined by adjustment of a throttle valve (not shown) and operation time of the water valves V1 and V2.

The powdered milk from the canisters 11 and 12 is mixed with the warm water 21 from the water tank 18 by motors MX1 and MX2, and artificial milk thus prepared is supplied through the mixers 6 and 7, mixing bowls 22 and 23 and hoses 24 and 25 to feeding plates 26 and 27 in the pigpens 4 and 5.

When the warm water 21 overflows the water tank 18, excess water is received in a water collecting bowl 28, and when the volume of water collected in the collecting bowl 28 reaches a certain limit, the limit switch LS1 is driven to make an overflow signal. The water tank 18 is provided with a thermometer 30 to indicate the temperature of the warm water 21 therein. The pigpens 4 and 5 are foldably assembled with shelters 31, folding frames 32, plywood panels 33 and wire-mesh guards 34.

Figure 4:
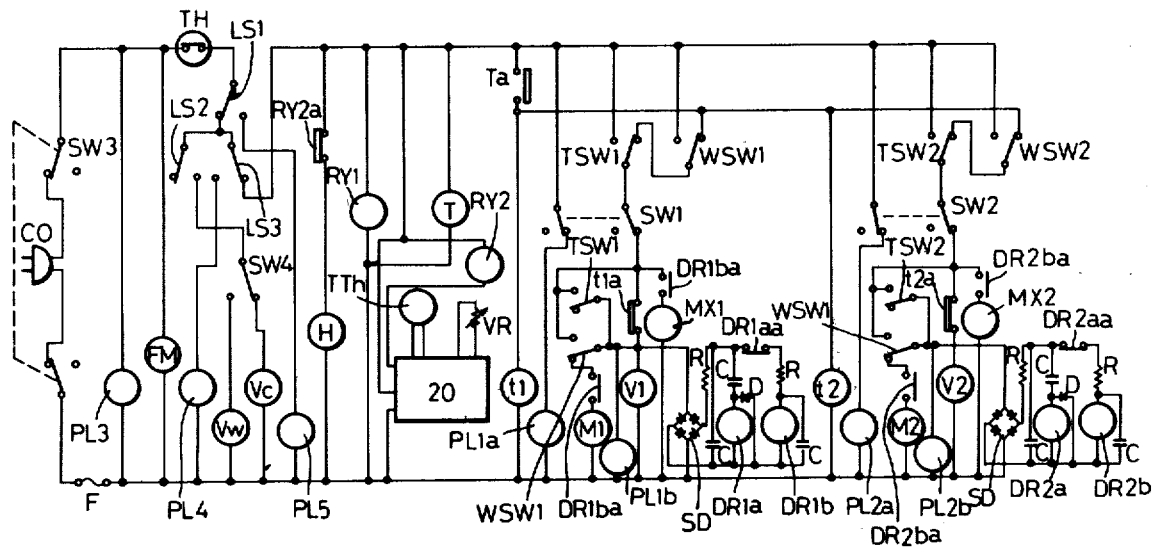
FIG. 4 is an electrical circuit diagram of the device of the present invention.
Figure 5:
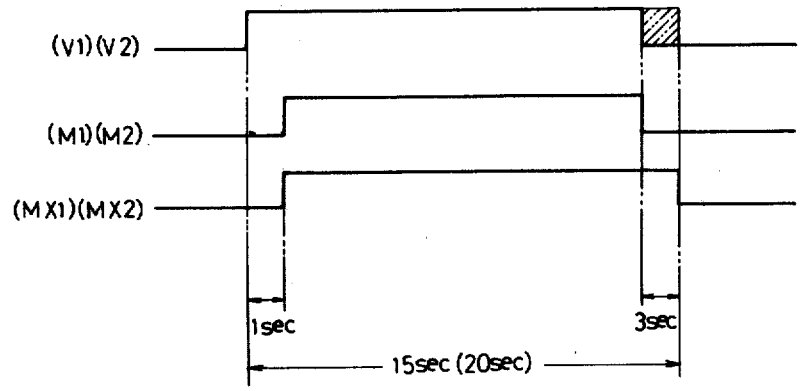
FIG. 5 is a performance chart of the circuit of FIG. 5.

Attention is now drawn to FIG. 4 which shows an electrical circuit of a control device 35 mounted in the box 3.

In operation, the temperature of the warm water 21 in the water tank 18 is set, e.g., at 60° C. by volume resistance VR in the automatic temperature controller 20, and the volume of the same supplied to the mixers 6 and 7 by the aforementioned throttle valve (not shown) is set to be, e.g., four times of that of the powdered milk supplied from the canisters 11 and 12. The time limits of a momentary operation timer t1 and a time-limit return timer t2 for feeding are set to be, e.g., 15 seconds and 20 seconds respectively, and the feeding time is set by a 24-hour program timer T to be, e.g., every two hours in a day from six o'clock in the morning till six o'clock in the evening. A change-over switch SW4 is driven to select the water source for the water tank 18 from the water pipe 16 and the cassette tank 17.

As shown in FIG. 4, delay relays DR1a, DR1b and DR2a, DR2b for canisters 11 and 12 are connected to a full wave rectifier SD through resistance R, a condensor C and a diode D. The delay relays DR1b and DR2b go on for one second when the delay circuit is switched on, and go off for three seconds when the delay circuit is switched off.

To start automatic feeding under the aforementioned condition, power switches SW1 and SW2 for the pigpens 4 and 5 are turned on while test switches TSW1 and TSW2 and wash switches WSW1 and WSW2 are kept off and a main power switch SW3 is turned on while an outlet CO is connected to a power source (not shown). Thereby a pilot lamp PL3 is turned on and a fan motor FM of a ventilation fan (not shown) is driven to rotate so as to keep the interior of the box 3 dry.

In the beginning, the limit switch LS1 is kept on since there is no water in the water collecting bowl 28, and the feed valve Vc is operated through the limit switch LS2 for detecting the maximum volume to supply water to the water tank 18 from the cassette tank 17. A pilot lamp PL4 is turned on by the limit switch LS3 for detecting the minimum volume and the heater 19 is operated through contact RY2a of a temperature control relay RY2, leading to operation of an alarm relay RY1 for making an alarm signal in case of power stoppage or shortage of water, the program timer T and the automatic temperature controller 20, and pilot lamps PL1a and PL2a for pigpens 4 and 5 are turned on.

When the limit switch LS2 for detecting the maximum volume operates in the above condition, the feed valve Vc is shut off to stop supplying water to the water tank 18.

In case the heater 19 accidentally operates when there is no water in the water tank 18, a thermostat TH functions to break the circuit of the heater 19. The temperature of the warm water 21 is maintained at 60° C. by the automatic temperature controller 20 and the heater 19.

At the feeding time when the contact Ta of the program timer T is on, pilot lamps PL1b and PL2b are turned on to indicate performance of feeding. The timers t1 and t2 operate the water valves V1 and V2 through the contacts t1a and t2a to supply the warm water 21 to the feeding plates 26 and 27 via the mixers 6 and 7, the mixing bowls 22 and 23 and the hoses 24 and 25 to moisten the passages of artificial milk and thereby prevent adherence of milk thereto.

After one second, the delay relays DR1b and DR2b operate the motors MX1 and MX2 for the mixers and the motors M1 and M2 for feeders through contacts DR1ba and DR2ba to supply artificial milk containing the powdered milk and the warm water 21 in the ratio of 1 to 4 to the feeding plates 26 and 27 for 14 seconds and for 19 seconds respectively. Then the contracts t1a and t2a go off to shut the water valves V1 and V2 and the motors M1 and M2 and thereby stop supplying the powdered milk and the warm water 21 to the mixers 6 and 7 while the warm water 21 remains in the passages of artificial milk to rinse the mixers 6 and 7 and wash off artificial milk in the passages. After three seconds of off-delay time of the delay circuit, the motors MX1 and MX2 are shut off and the contact Ta of the program timer T returns back to complete the feeding operation.

When power is on, the device can be manually operated by turning the test switches TSW1 and TSW2 on. Also when power is on, the water valves V1 and V2 alone can be turned on by turning the wash switches WSW1 and WSW2 on to automatically wash the passages of artificial milk and the feeding plates 26 and 27. Further, the entire feeding operation can be automatized to facilitate reduction of labor.

In the device of the present invention, numbers of parts such as the canisters 11 and 12, the mixers 6 and 7, the water valves V1 and V2 and the hoses 24 and 25 can optionally be increased, and a canister can be provided with a plurality of feeders if desired.

While the invention has been described with reference to a preferred embodiment thereof, it is to be understood that modifications or variations may be easily made without departing from the scope of this invention which is defined by the appended claims.

What is claimed is:

1. An automatic feeding device for domestic animals comprising:

a canister containing powder for preparing liquefied food;

a feeder connected to said canister;

a water tank containing warm water for preparing said liquefied food while keeping said warm water at a certain temperature;

a water valve connected to said water tank for a controlled discharge of water therefrom;

a mixer connected to said feeder and said water valve to receive and mix said powder and said warm water therein to give said liquefied food;

a pipe connecting said mixer to said water valve, said pipe being of a length whereby warm water remaining therein, after stoppage of said water valve, is sufficient to rinse said mixer for a certain period;

a mixing bowl for receiving warm water or liquefied food flowing from said mixer;

a hose extending from said mixing bowl for supplying warm water or liquefied food from said mixing bowl to feeding plates in animal cages;

a 24-hour program timer for optionally setting feeding time; and an electrical control circuit including means opening said water valve while retaining said feeder inactive to supply only warm water to said mixer for a predetermined time, thereafter also activating said feeder and mixing powdered food with said warm water to produce liquefied food, and stopping said feeder and said water valve at a certain interval upon receipt of a signal from said program timer, said electrical control circuit being set to substantially simultaneously stop said water valve and said feeder after said liquefied food is produced.

* * * * *